Jan. 12, 1943. H. O. SCHJOLIN 2,308,114
SEAL
Filed Jan. 10, 1942 2 Sheets-Sheet 1

Inventor
Hans O. Schjolin
By
Blackmore, Spencer & Flint
Attorneys

Jan. 12, 1943. H. O. SCHJOLIN 2,308,114
SEAL
Filed Jan. 10, 1942 2 Sheets-Sheet 2

Inventor
Hans O. Schjolin
Attorneys

Patented Jan. 12, 1943

2,308,114

UNITED STATES PATENT OFFICE 2,308,114

SEAL

Hans O. Schjolin, Birmingham, Mich., assignor to Yellow Truck & Coach Manufacturing Company, Pontiac, Mich., a corporation of Maine Application January 10, 1942, Serial No. 426,295

5 Claims. (Cl. 286—11)

Hydraulic transmissions for heavy duty coaches present an acute problem in effectively sealing the interior of the rotor housing. Various types of commercial seals have been used with none giving prolonged satisfactory service. Seal failure is both annoying and expensive not only because of loss of fluid but because replacement consumes a lot of time since it necessitates complete dismantling by a skilled mechanic of the complicated transmission mechanism in order to reach inaccessible seal locations. During such time the passenger bus is out of revenue producing service and disturbs the operating schedule and efficiency of the transportation system.

It is, therefore, an object of the present invention to provide for use between relatively rotatable parts a seal which is more reliable than those heretofore available and one which can be readily substituted in place of shaft seals incorporated in power transmissions already in use.

A further important object of the invention is to provide an improved pressure seal structure involving a flexible diaphragm closure secured to one of the relatively rotatable parts and to a spring pressed sealing ring having an accurately machined running fit on the other part with the sealing ring and diaphragm having interlocking formations and being permanently fastened to one another in subassembly in a manner which is inexpensive and simple to effect without costly equipment and insures against looseness and failure in use and results in tight sealing contact over a long period of operation.

Another object is to provide a pressure seal in which the seal subassembly and its thrust exerting spring are mounted and contained within a housing or shell as a single assembly to be handled as a unit without additional parts to be fitted and adjusted to each other.

Figure 1:
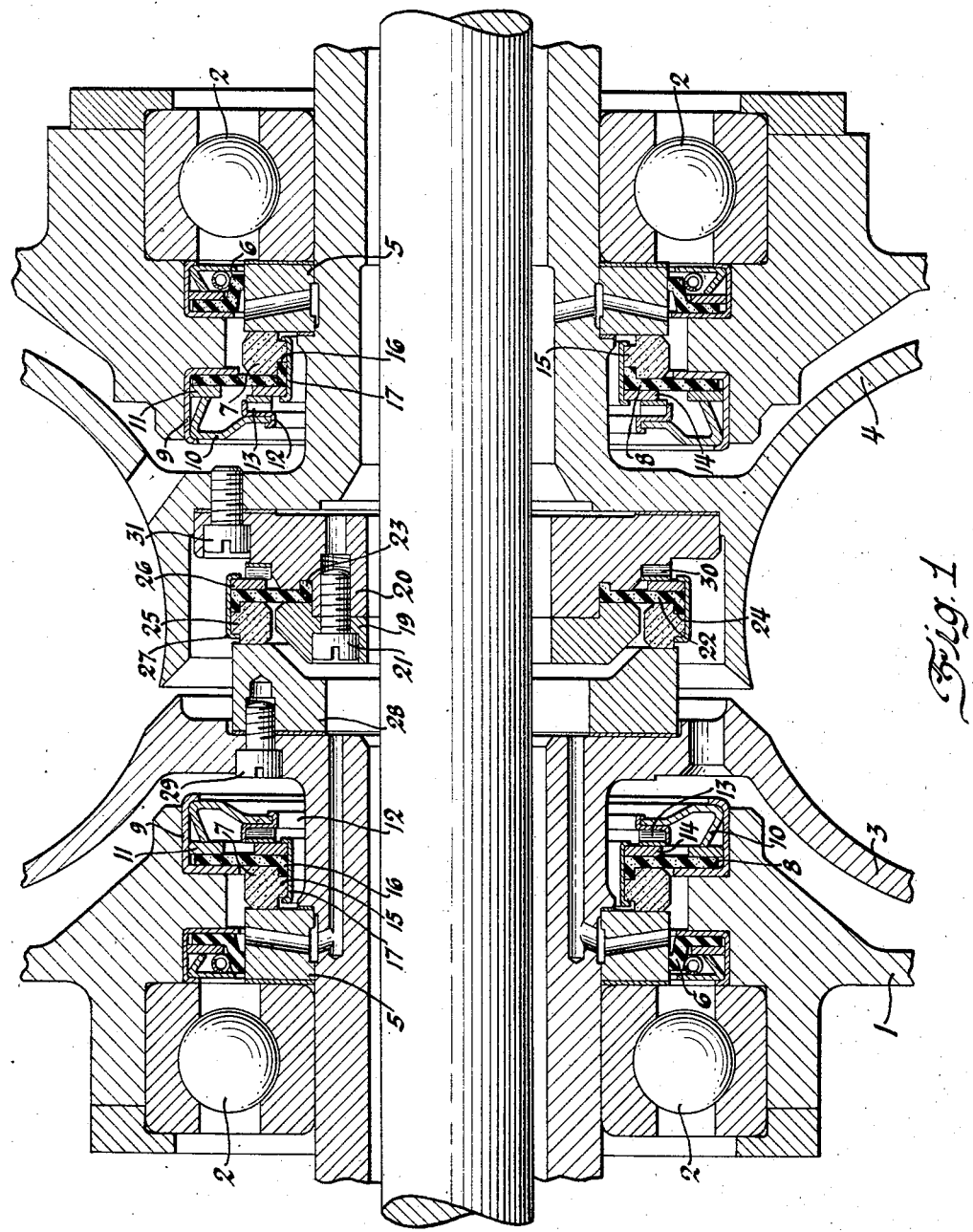
Figure 2:
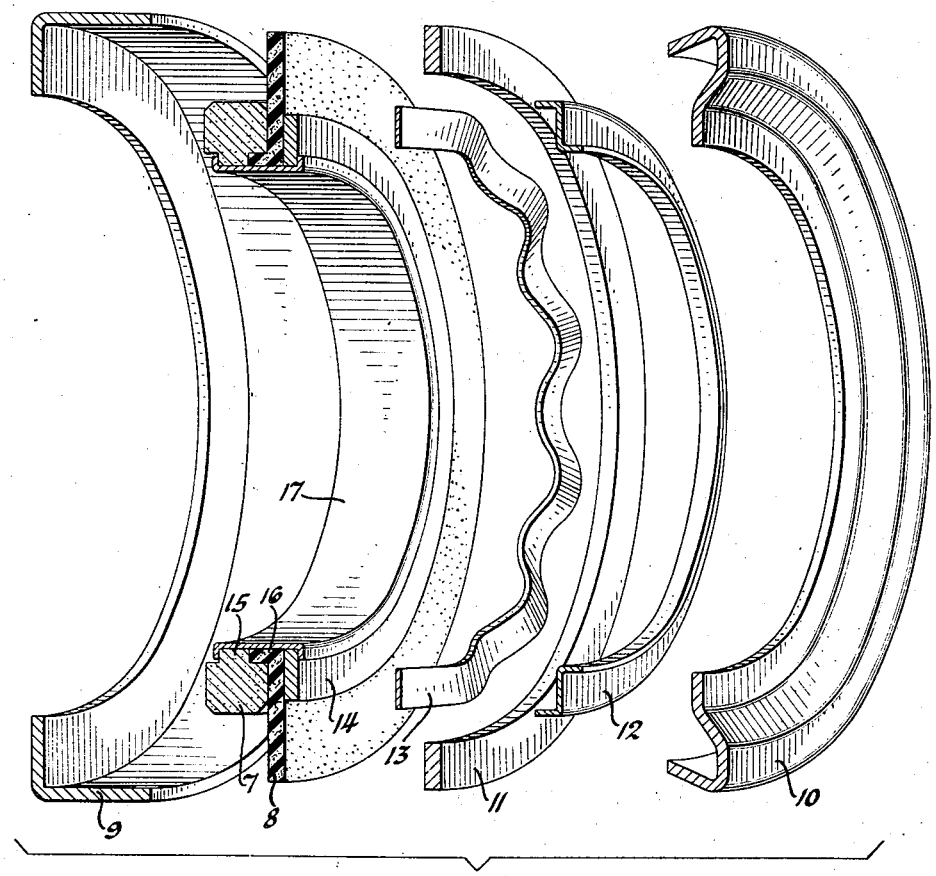

Additional objects and advantages will become apparent upon inspection of the accompanying drawings wherein Figure 1 is a sectional view of a portion of a fluid coupling or torque converter incorporating seals made according to preferred embodiments of the invention and Figure 2 shows in perspective the several parts of the seal unit in exploded relation.

The torque converter partially shown in Figure 1 is of a well known type and includes a stationary housing 1 having ball bearing assemblies 2—2 in opposite ends rotatably supporting the hubs of the relatively rotatable driving impeller 3 and driven rotor 4 operating within the working chamber afforded by the housing 1. Each hub carries a contact ring 5 adjacent the inner race of its bearing support 2 and is surrounded by a secondary sealing unit 6 having its housing press fitted into a shouldered portion of the housing 1 and its flexible packing member wiping on the periphery of the contact ring 5.

As a primary seal the radial face of the contact ring 5 has a running fit with one radial face of a spring seated ring 7 formed of synthetic carbon, graphite or the like. These contacting faces are accurately machined true to each other and are lapped to a mirror-like finish for continuous circular contact. To complete the seal the ring 7 is fastened to the inner margin of a flexible annular diaphragm 8 of impervious leather, synthetic rubber or the like and whose outer margin is clamped in liquid tight engagement in a mounting shell or housing press fitted in a shouldered seat formed in the housing 1. The shell may consist of a pair of interfitted cups or sheet steel pressings 9 and 10 providing a pair of axially spaced radial flanges. The lateral flange or skirt of the inner cup member 10 may be of frusto-conical shape with its edge seated against a clamping washer 11 which presses the outer margin of the diaphragm 8 against the radial flange or base of the outer cup 9. The cups are retained in nested relation by spinning inwardly the end of the lateral skirt of the cup 9 to afford a retaining flange engaging the radial flange or base of the inner cup 10. At its central margin the inner cup 10 is axially depressed and forms a mounting for a locating ring 12 which is substantially Z-shape in section with its innermost leg spun over the internal edge of the radial flange on the stamped cup 10. The opposite leg of the retainer 12 locates a wavy spring washer 13 which bears against a thrust receiving pressure plate 14 forming a part of the seal subassembly whereby the bearing ring 7 is maintained in sealing engagement with the contact ring 5. The fit of the contact faces as well as the general arrangement of the parts are such as to maintain sealing relation unaffected by centrifugal forces.

It will be noted that both radial faces of the sealing ring 7 have their corners rabbeted or relieved so that an inwardly projecting rib 15 is located on the interior of the pressure ring 7. One of these rabbeted corners provides a pocket to receive the annular lateral extension or skirt 16 occurring at the inner margin of the flexible diaphragm 8. The other rabbeted corner provides a recess into which is fitted an outturned flange engaging the internal rib 15 and spun thereover at one end of a sleeve or band 17. This band 17 spans the ring 7, the diaphragm extension 16 and the thrust ring 14 and its opposite end is spun or flanged outwardly to engage the ring 14 and thereby permanently clamp the parts together with the diaphragm held between the rings 7 and 14. In this manner an effective fastening is provided as a subassembly operation whereby the parts are interlocked against the likelihood of accidental dislodgement with no interference to the wiping contact of the relatively movable rings in performing the sealing function.

While the description thus far has been specifically to a sealing unit wherein the housing or shell surrounds the sealing ring and is press fitted in an outer member it is obvious that the internal-external relation of the parts may be reversed in which case the stamped cups of the unit would be press fitted to an internal member. In addition it is within the scope of the invention to omit the parts which are to be press fitted to one of the relatively rotatable members in a fashion similar to the seal which is provided centrally of the hubs for the rotating parts 3 and 4. In this instance the two part clamping rings 19 and 20 are secured together by a series of studs 21 to clamp therebetween the diaphragm 22. This diaphragm has an internal bead or lateral extension 23 fitted to an annular groove in the ring 20 and an external bead or lateral extension 24 in interlocking engagement with a rabbeted corner of the seal ring 25 against which it is clamped by the thrust ring 26 with a retaining band or sleeve 27 whose opposite ends are spun over the ring 26 and the external rib of the ring 25 and into the rabbet in the exposed contact face of the sealing ring. This bearing face is ground true to the cooperating face of a contact ring 28 secured by a series of bolts 29 to the impeller 3. The sealing faces are maintained in engagement by the wavy spring washer 30 bearing against the thrust washer 26 and fitted to a shouldered portion of the ring 20 which in turn is secured by a series of studs 31 to the driven rotor 4.

I claim:
1. A sealing unit for use between relatively rotatable parts, including a sealing ring engageable with one of the parts and having rabbeted corners in both of its radial faces on opposite sides of the ring, a flexible diaphragm having one edge portion fitted to one of said faces with a lateral extension pocketed in and completely filling the adjacent rabbeted corner, a thrust receiving washer holding the diaphragm against the ring, a cylindrical sleeve spanning and having its opposite ends flanged radially over the ring and the washer, respectively, with one flanged end pocketed within the rabbeted corner in the bearing face of the sealing ring and wholly inwardly of the radial plane of said bearing face, a shell to be secured to the other of said parts, means securing the other edge portion of the diaphragm to the shell and spring means interposed between the shell and the thrust receiving washer.

2. In a unitary seal assembly, a shell having a pair of axially spaced radial flanges, a spring seating ring secured to one of the flanges and provided with an axially extending retainer shoulder, a wavy ring spring having one face seated on the ring with its edge retained by the shoulder between the flanges, a flexible annular diaphragm having an edge portion secured to the other shell flange and terminating at its other edge in a lateral extension, a sealing ring located axially outside the shell flanges and provided on opposite radial faces with rabbeted corners, one of which pockets said lateral extension, a thrust receiving ring seating on the opposite face of the spring and clamping the diaphragm against the sealing ring and a retainer cylinder spanning the thrust ring, the diaphragm and the sealing ring with one edge flanged over the thrust ring and its opposite edge flanged into the other of said rabbeted corners of the sealing ring to hold said parts in subassembly relation.

3. A unitary seal assembly for use between relatively rotating parts, including a mounting member to be press fitted to one of the parts, a sealing ring having a radially extending bearing face exposed on one side for a running fit on the other of the parts and having rabbeted portions in both of its side faces with an annular rib intermediate said rabbeted portions, a flexible sealing diaphragm between the mounting member and said ring and terminating in a lateral lip fitted into the rabbeted portion in the side face of the ring opposite its exposed bearing face, a pressure washer for clamping the diaphragm against the ring and an axially extending hollow cylindrical sleeve spanning the washer, the diaphragm lip and the annular rib, with opposite ends bent over the washer and said rib and with the rib engaging bent end seated within the rabbeted portion in the exposed bearing face of the sealing ring.

4. In a seal for use between relatively rotatable members, a pair of rings, one thereof being arranged for a running sealing engagement with one of the members, a flexible annulus having one edge portion confined between the rings and its opposite edge portion projected therefrom for sealing connection with the other member, said seal parts being characterized by a lateral extension on the confined edge portion of the annulus and by rabbeted portions in opposite radial faces of one of the rings with said lateral extension interlocked and seated within one of said rabbeted portions, and a retainer cylinder having opposite ends flanged radially over said rings with one of said flanged ends seated within the other of said rabbeted portions and wholly inside the radial plane containing the sealing face of the ring.

5. A seal assembly for use between relatively rotatable parts, including a flexible diaphragm having one edge portion adapted for sealing connection to one of the parts, a pair of rings confining between them the other edge portion of the diaphragm, one of which is a sealing ring for a running fit on the other of said parts, said sealing ring being characterized by rabbeted corners in opposite faces and said diaphragm having a lateral extension nested within the rabbeted corner of its adjacent face and a retainer cylinder having opposite ends flanged radially over the rings with one flanged end fitted to the rabbeted corner in the exposed face of the bearing ring and located wholly inwardly of the plane of said face.

HANS O. SCHJOLIN.